United States Patent
Soma

(10) Patent No.: US 8,599,141 B2
(45) Date of Patent: Dec. 3, 2013

(54) INPUT DEVICE HAVING COORDINATE-INPUTTING UNIT AND SWITCHING UNIT

(75) Inventor: Masahiro Soma, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 2104 days.

(21) Appl. No.: 11/147,775

(22) Filed: Jun. 8, 2005

(65) Prior Publication Data

US 2005/0275627 A1 Dec. 15, 2005

(30) Foreign Application Priority Data

Jun. 11, 2004 (JP) ................. 2004-174587

(51) Int. Cl.
G06F 3/041 (2006.01)
G06F 3/038 (2013.01)

(52) U.S. Cl.
USPC .......................... 345/173; 345/204

(58) Field of Classification Search
USPC ......... 345/156, 157, 158, 159, 160, 168, 169, 345/170, 172, 173, 174, 175, 176, 177, 178, 345/179, 180, 181, 182, 183, 184, 204, 345/163; 178/18.01, 18.03, 18.06, 20.01; 200/513; 341/5
See application file for complete search history.

(56) References Cited

U.S. PATENT DOCUMENTS

| | | | | |
|---|---|---|---|---|
| 4,499,343 A * | 2/1985 | Prioux et al. | ................. | 200/5 A |
| 5,146,615 A * | 9/1992 | Hodsdon et al. | ............. | 455/90.3 |
| 5,543,589 A * | 8/1996 | Buchana et al. | ........... | 178/18.03 |
| 5,670,755 A * | 9/1997 | Kwon | ........................ | 178/18.05 |
| 5,691,747 A * | 11/1997 | Amano | ......................... | 345/167 |
| 5,917,906 A * | 6/1999 | Thornton | ................. | 379/433.07 |
| 5,942,733 A * | 8/1999 | Allen et al. | ................. | 178/18.01 |
| 5,988,902 A * | 11/1999 | Holehan | .................. | 400/479.1 |
| 6,072,475 A * | 6/2000 | van Ketwich | ................. | 345/173 |
| 6,094,190 A * | 7/2000 | Kodim | ......................... | 345/167 |
| 6,204,839 B1 * | 3/2001 | Mato, Jr. | ......................... | 345/168 |
| 6,259,044 B1 * | 7/2001 | Paratore et al. | ............... | 200/5 A |
| 6,369,803 B2 * | 4/2002 | Brisebois et al. | ............. | 345/173 |
| 6,380,497 B1 * | 4/2002 | Hashimoto et al. | ........... | 200/5 A |
| 6,388,660 B1 * | 5/2002 | Manser et al. | ................. | 345/173 |
| 6,518,958 B1 * | 2/2003 | Miyajima et al. | ............. | 345/173 |
| 6,704,005 B2 | 3/2004 | Kato et al. | | |
| 6,737,596 B1 * | 5/2004 | Hein | .......................... | 200/310 |
| 6,842,015 B2 * | 1/2005 | Morimoto | ..................... | 324/662 |
| 6,924,789 B2 * | 8/2005 | Bick | .......................... | 345/168 |
| 6,977,644 B2 * | 12/2005 | Endo et al. | ..................... | 345/157 |
| 7,102,086 B2 * | 9/2006 | Bick et al. | ..................... | 200/5 A |
| 7,166,813 B2 * | 1/2007 | Soma et al. | ................... | 200/600 |
| 7,279,647 B2 * | 10/2007 | Philipp | ........................ | 200/5 R |
| 7,312,790 B2 * | 12/2007 | Sato et al. | .................... | 345/173 |
| 7,339,577 B2 * | 3/2008 | Sato et al. | .................... | 345/173 |
| 7,348,898 B2 * | 3/2008 | Ono | ................................ | 341/33 |
| 7,359,999 B2 * | 4/2008 | Sato | ................................ | 710/67 |

(Continued)

*Primary Examiner* — Michael Faragalla
(74) *Attorney, Agent, or Firm* — Brinks Gilson & Lione

(57) ABSTRACT

An input device is provided. The input device contains a face sheet, coordinate-inputting means opposing the lower portion of the face sheet, and switching means opposing the lower portion of the coordinate-inputting means. The face sheet, the coordinate-inputting means, and the switching means are laminated in a thickness direction. The coordinate-inputting means has X- and Y-direction electrodes opposing each other and arranged on both surfaces of a base sheet in a grid manner. The switching means has a substrate with a switch contact portions in a grid arrangement. The switch contact portions are switched by the inversion of invertible plates. Projections are disposed between the coordinate-inputting means and the invertible plates.

4 Claims, 6 Drawing Sheets

(56) References Cited

U.S. PATENT DOCUMENTS

| | | | |
|---|---|---|---|
| 2001/0024194 A1* | 9/2001 | Shigetaka et al. | 345/173 |
| 2002/0000284 A1* | 1/2002 | Nishi | 156/82 |
| 2002/0000979 A1* | 1/2002 | Furuhashi et al. | 345/173 |
| 2002/0021280 A1* | 2/2002 | Kato et al. | 345/156 |
| 2002/0049070 A1* | 4/2002 | Bick | 455/550 |
| 2002/0054030 A1* | 5/2002 | Murphy | 345/173 |
| 2002/0180707 A1* | 12/2002 | Sato et al. | 345/169 |
| 2003/0030628 A1* | 2/2003 | Sato et al. | 345/173 |
| 2003/0067449 A1* | 4/2003 | Yoshikawa et al. | 345/173 |
| 2003/0071784 A1* | 4/2003 | Sato et al. | 345/156 |
| 2003/0213683 A1* | 11/2003 | Shimizu et al. | 200/341 |
| 2004/0070572 A1* | 4/2004 | Nakajima | 345/173 |

* cited by examiner

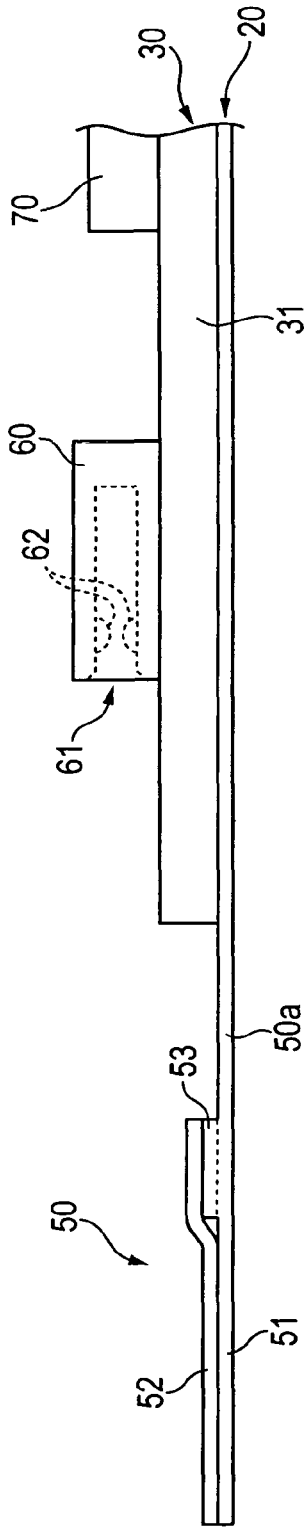
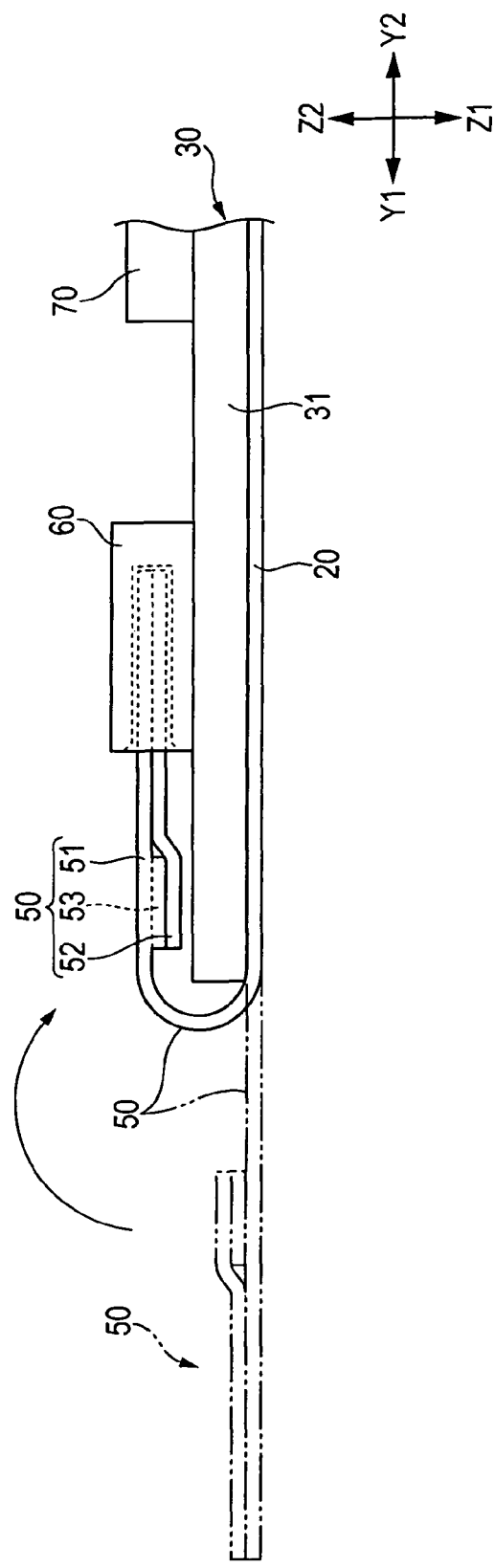

INPUT DEVICE HAVING COORDINATE-INPUTTING UNIT AND SWITCHING UNIT

This application claims the benefit of priority to Japanese Patent Application No. 2004-174587, filed on Jun. 11, 2004, herein incorporated by reference.

BACKGROUND OF THE INVENTION

1. Field of the Invention

The present invention relates to capacitive input devices installed in small and thin electronic apparatuses such as notebook computers, and in particular, relates to input devices having coordinate-inputting means and switching means.

2. Description of the Related Art

FIG. 6 is a cross-sectional view of a known input device shown in FIG. 4 in Japanese Unexamined Patent Application Publication No. 2002-351606. This input device includes a switching unit 9, a coordinate-inputting unit 7 with a coordinate-inputting section 7a, and a face sheet 8 with an operating surface 8a laminated in this order. In the coordinate-inputting unit 7, X-direction electrodes and Y-direction electrodes oppose each other in a grid arrangement with an insulative resin sheet 12 having a predetermined conductivity therebetween, and the resin sheet is disposed on a substrate having an electrically conductive pattern. The top surface of the resin sheet functions as the coordinate-inputting section 7a. The coordinate-inputting unit 7 can be deformed. The top surface of the face sheet 8 functions as the operating surface 8a, and marks such as "OFF" and "ON" and characters such as "1" and "2" are printed thereon. When part of the coordinate-inputting section 7a is pushed, a portion corresponding to that part is deformed. When a dielectric such as a finger comes into contact with the surface of the coordinate-inputting section 7a, the capacitances between the X-direction electrodes and the Y-direction electrodes are varied. Coordinate signals can be detected from these variations.

Meanwhile, the switching unit 9 is disposed below the coordinate-inputting unit 7, and includes a plurality of switches connected with each other in parallel and arranged on a switching-unit surface. The face sheet 8, the coordinate-inputting unit 7, and the switching unit 9 are superposed such that the positions of the switches correspond to those of inputting points 8b shown on the operating surface 8a. When the inputting points 8b on the face sheet 8 are pushed by fingers or pens, both the coordinate-inputting unit 7 and face sheet 8 are concaved. Since invertible plates 15 are concaved by the pushing force and come into contact with respective electrode components $13a_1$, $13a_2$ electrodes 13a and signal-connecting patterns 13b become conductive and the output is switched to ON.

More specifically, in the top face of the resin sheet 12, a circular electrode 13a1 and a ring-like electrode 13a2 are formed. An electric conduction pattern 13b on the opposite surface of the resin sheet 12 and in a resin pedestal 18 is connected with the electrode 13a1 through a conductor 14 in a through hole. A resist film 16a is disposed in the perimeter of the invertible plates 15 and separates a top resin sheet 17 from the resin sheet 12.

In order to provide an excellent tactile feel to operators operating the switches in the above-described input device, the invertible plates should be concaved with a smaller force, in other words, the pushing force given by the operators should be focused on the invertible plates.

However, in the above-described input device, marks ("OFF", "ON", and the like) and numerals ("1", "2", and the like) indicating the positions of the switches are printed on the operating surface of the face sheet. Therefore, the operators need to visually check the marks and the numerals, i.e. need to check the positions of the switches, during the switching operation; and the pushing force is hardly focused on the invertible plates.

Moreover, as described above, the coordinate-inputting unit is of a capacitance type that detects the position of the finger or the like on an XY-plane coordinates by detecting the variations of the capacitances as voltages by means of the capacitances generated among the finger or the like, the X-direction electrodes, and the Y-direction electrodes and varied in response to the transfer of the finger or the like. Accordingly, the capacitances are required to be accurate in inverse proportion to the distances between the finger or the like and the electrodes.

However, in the above-described input device, coupling capacitances are also generated between the invertible plates disposed under the coordinate-inputting unit and the electrodes. In addition, the variations of the coupling capacitances caused by each deformation of the invertible plates disadvantageously lead to a reduction in the accuracy of the detected coordinate positions.

SUMMARY OF THE INVENTION

Accordingly, it is an object of the present invention to provide an input device capable of switching with a smaller pushing force by focusing the pushing force on invertible plates, and in addition, capable of providing an excellent tactile feel.

Furthermore, it is an object of the present invention to provide an input device having a coordinate-inputting unit with an improved detecting accuracy, the input device including the coordinate-inputting unit and a switching unit integrally laminated in the height direction.

The input device according to the present invention includes a face sheet, coordinate-inputting means opposing the lower portion of the face sheet, and switching means opposing the lower portion of the coordinate-inputting means. The input device is characterized in that the face sheet, the coordinate-inputting means, and the switching means are laminated in the thickness direction; the coordinate-inputting means includes a plurality of X-direction electrodes and Y-direction electrodes opposing each other and arranged on both surfaces of a base sheet in a grid manner; the switching means includes a substrate having a plurality of switch contact portions in a grid arrangement, the switch contact portions being switched by the inversion of invertible plates; and projections are disposed between the coordinate-inputting means and the invertible plates.

According to the input device of the present invention, the pushing force applied to the face sheet can be focused on the switch contact portions via the projections. Therefore, the switching operation can be reliably performed in the input device even with a small pushing force.

According to the above-described invention, the input device preferably includes protrusions protruding upward from an upper surface of the face sheet at positions corresponding to the switch contact portions.

With the above-described means, the operator can recognize the shape or the like of the protrusions only from the feeling of the fingertip, and thus can recognize the position of his/her finger on the face sheet. As a result, the operator is not required to visually check marks or numerals printed on the face sheet.

At least one of the plurality of projections and the plurality of protrusions may be formed with an ultraviolet curable resin.

With the above-described means, the projections or the protrusions can easily be formed in a short time. According to the above-described invention, the input device preferably includes bonding means for fixing the coordinate-inputting means to the switching means disposed at intermediate positions between two adjacent switch contact portions and at positions outside an area where the switch contact portions are arranged in a grid manner.

For example, a double-sided adhesive tape may be employed as the bonding means. The bonding means is disposed around the periphery of an area where the projections are arranged at regular intervals. In other words, a plurality of bonding means is not disposed around each projection. Therefore, the face sheet and the base sheet are flexible, and can be deformed by a smaller pushing force compared with the known technology. As a result, the operator can receive an improved tactile feel.

Moreover, the base sheet of the coordinate-inputting means preferably includes a plurality of first positioning hole, the substrate of the switching means preferably includes a plurality of second positioning holes, and the base sheet and the substrate are preferably positioned with respect to each other when the first positioning holes and the second positioning holes overlap each other.

In the above-described means, X-direction electrodes, Y-direction electrodes, protrusions, projections, or the like can be formed on the basis of the positioning holes. Accordingly, when the face sheet, the coordinate-inputting means, and the switching means are laminated, the projections can be positioned immediately above the switch contact portions, and the protrusions can also be positioned immediately above the respective projections. As a result, the pushing force applied to the protrusions can be directly transmitted to the switch contact portions, resulting in an improved tactile feel.

Furthermore, the input device according to the present invention includes a face sheet, coordinate-inputting means opposing the lower portion of the face sheet, and switching means opposing the lower portion of the coordinate-inputting means. The input device is characterized in that the face sheet, the coordinate-inputting means, and the switching means are laminated in the thickness direction; the coordinate-inputting means includes a base sheet having a plurality of X-direction electrodes and Y-direction electrodes that oppose each other and that are arranged on both surfaces of the base sheet in a grid manner; the switching means includes a substrate having a plurality of switch contact portions in a grid arrangement, the switch contact portions being switched by the inversion of invertible plates; and a ground electrode extends over an area where the base sheet of the coordinate-inputting means and the substrate of the switching means oppose each other.

According to the above-described invention, the coordinate-inputting means can be less susceptible to the operation of the switch contact portions. Accordingly, the coordinate-inputting accuracy can be improved.

In addition, the input device according to the present invention includes a face sheet; coordinate-inputting means opposing the lower portion of the face sheet and including a base sheet having a plurality of X-direction electrodes and Y-direction electrodes that oppose each other and that are arranged on both surfaces of the base sheet in a grid manner; and switching means opposing the lower portion of the coordinate-inputting means and including a substrate having a plurality of switch contact portions in a grid arrangement, the switch contact portions being switched by the inversion of invertible plates. The input device is characterized in that the face sheet, the coordinate-inputting means, and the switching means are laminated in the thickness direction; the coordinate-inputting means includes a first connector portion protruding from the coordinate-inputting means and having a plurality of printed connecting patterns extended from the X-direction electrodes and the Y-direction electrodes and a printed ground electrode extension, a second connector portion having the same shape as the first connector portion and having a ground pattern extended from the ground electrode, and a connecting portion extending from a base end of the first connector portion and connecting the first connector portion to the second connecting portion; and the first and second connector portions layered by folding the connecting portion a plurality of times forms a male connector.

According to the above-described invention, the thickness of the connector formed of the base sheet can be increased. Therefore, when the male connector is fitted into a female connector, poor connection at contacts can be avoided.

BRIEF DESCRIPTION OF THE DRAWINGS

FIGS. 5A and 5B are side views illustrating the states of the connector before and after connection, respectively.

DESCRIPTION OF THE PREFERRED EMBODIMENTS

Figure 1:
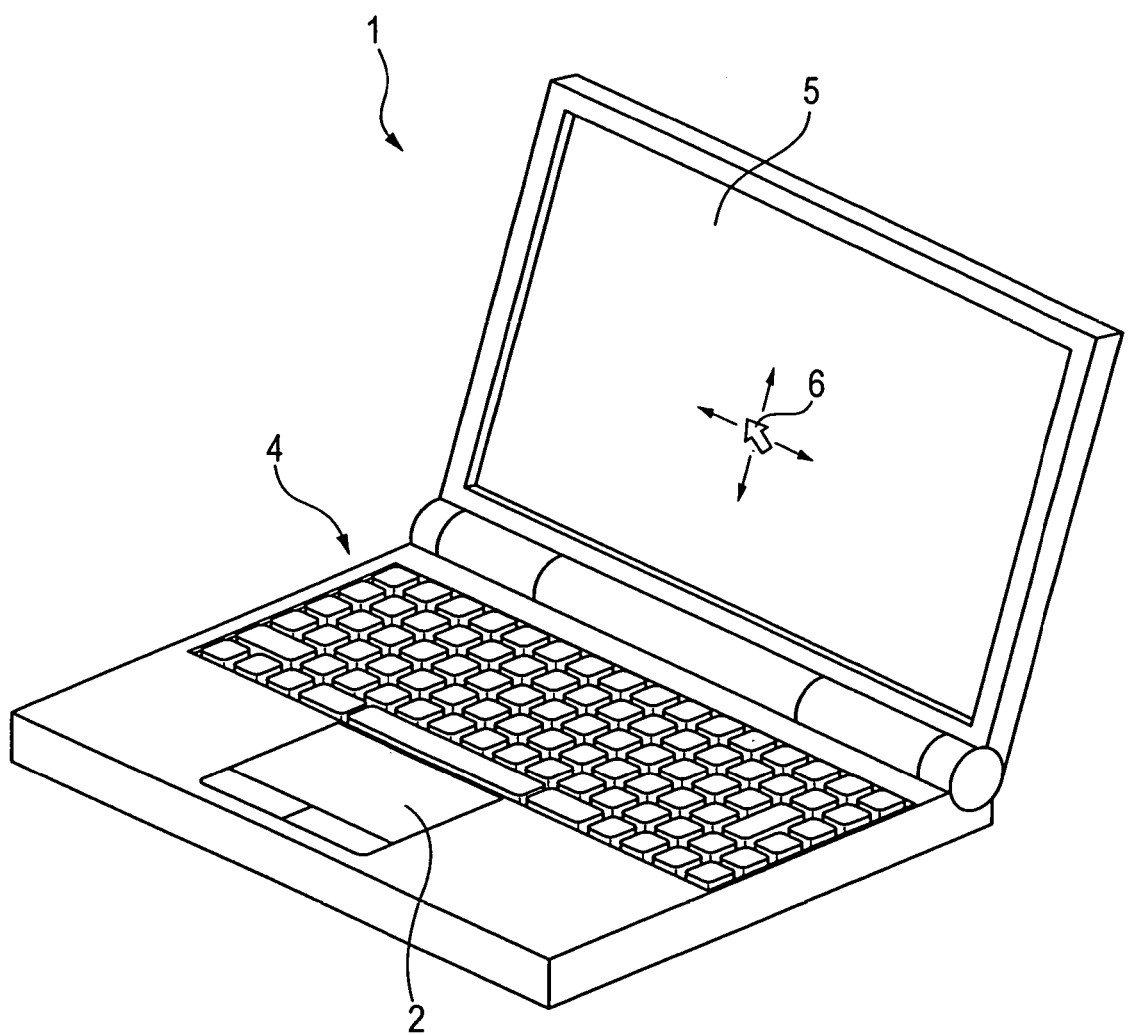
FIG. 1 is a perspective view illustrating a computer as an electronic apparatus including an input device according to the present invention.
Figure 2:
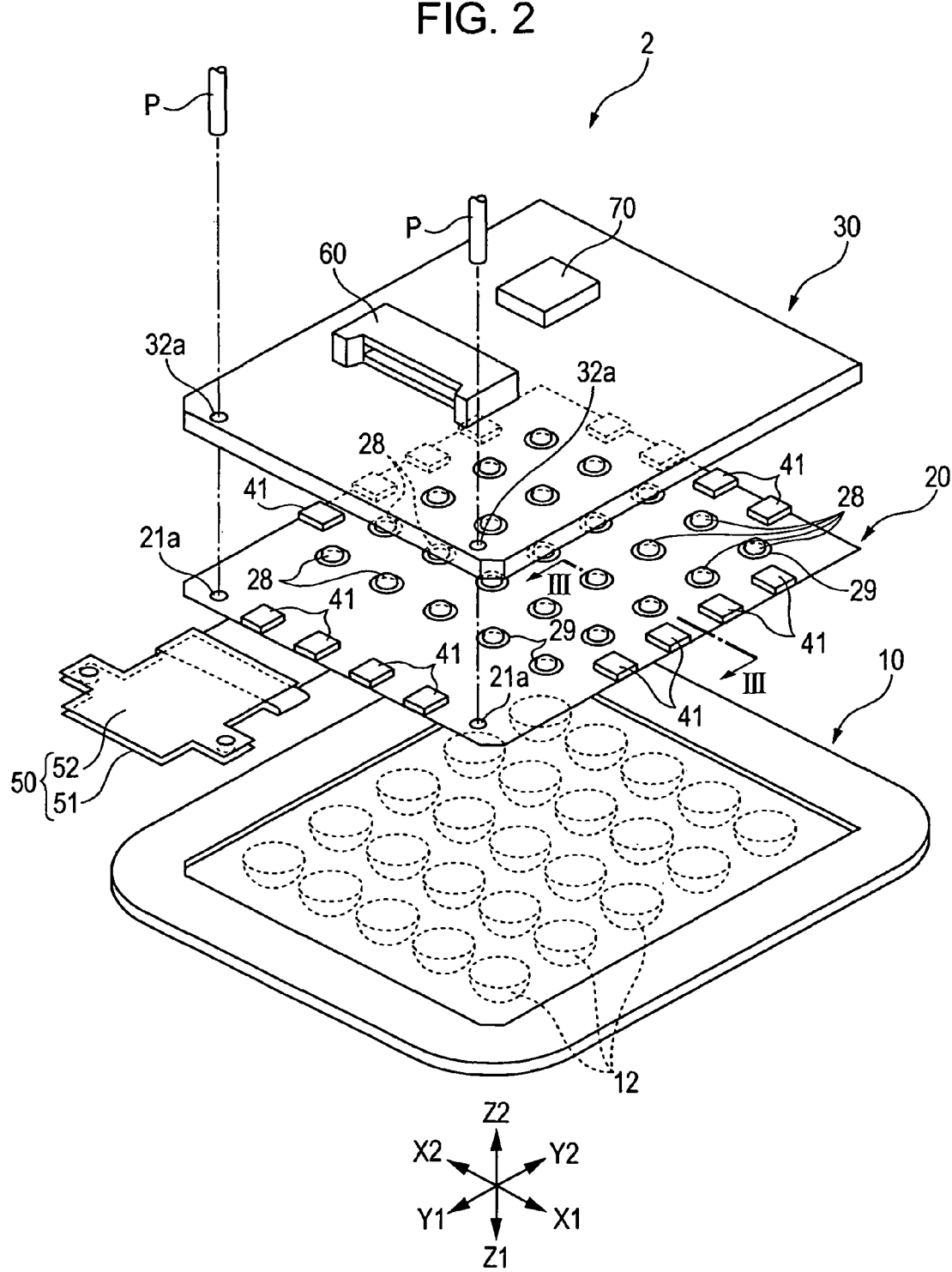
FIG. 2 is an exploded perspective view of the input device according to an embodiment of the present invention.
Figure 3:
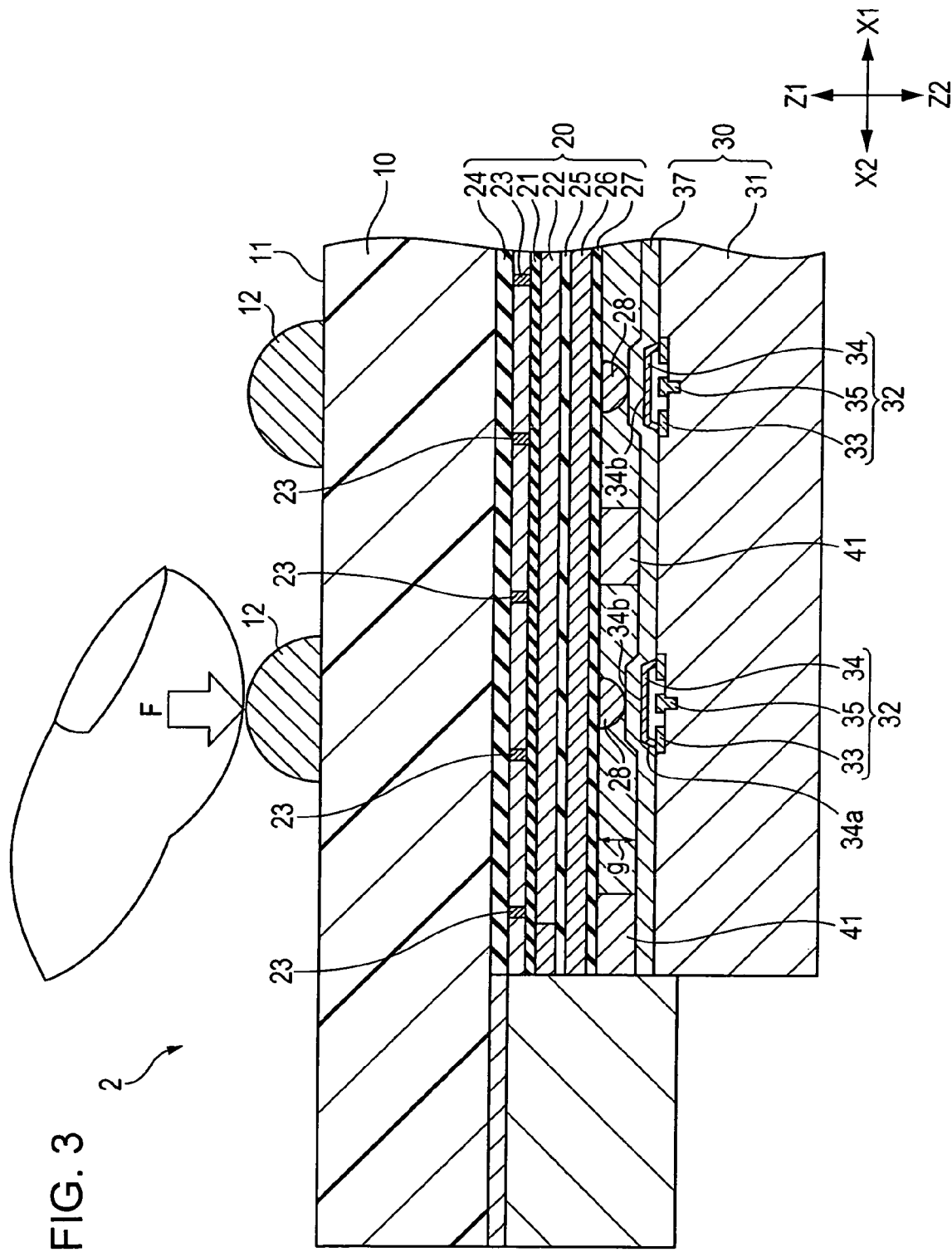
FIG. 3 is a cross-sectional view taken along line III-III in FIG. 2.
Figure 4A:
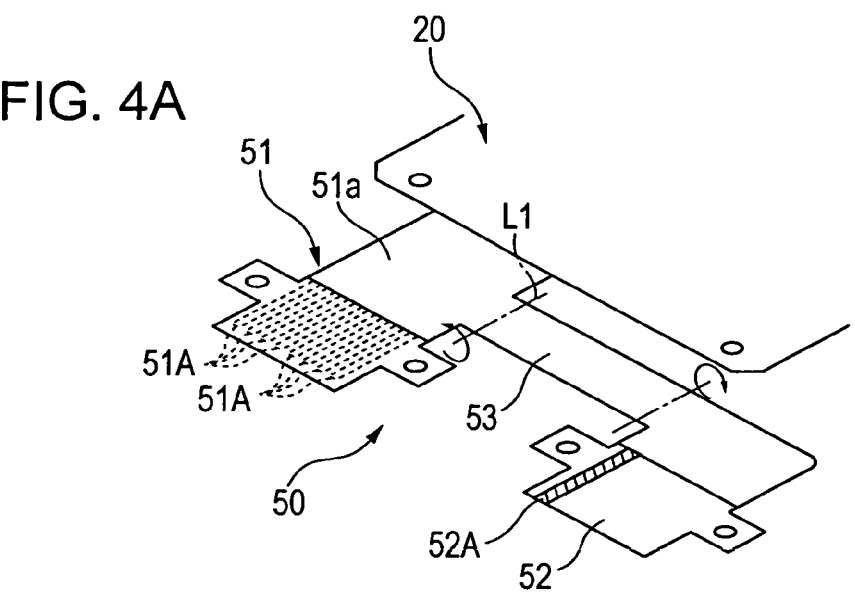
FIGS. 4A to 4C are perspective views illustrating a process for assembling a male connector.
Figure 4B:
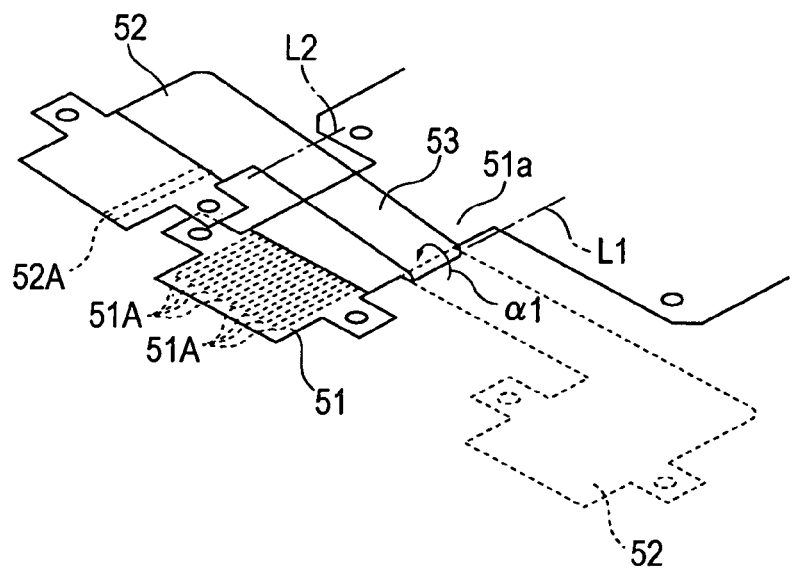
Figure 4C:
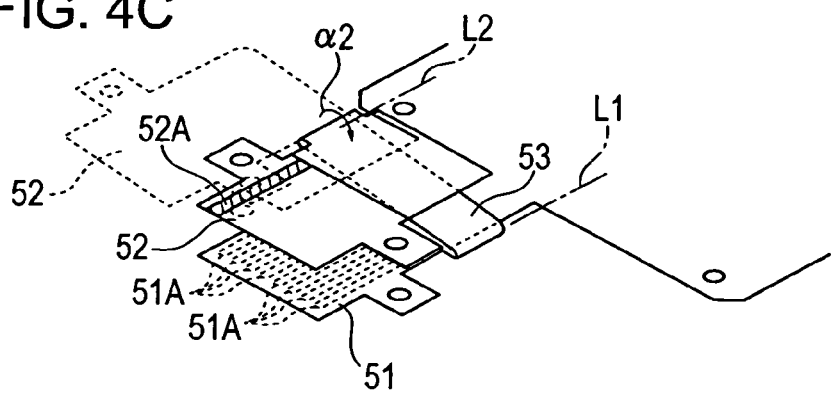
Figure 6:
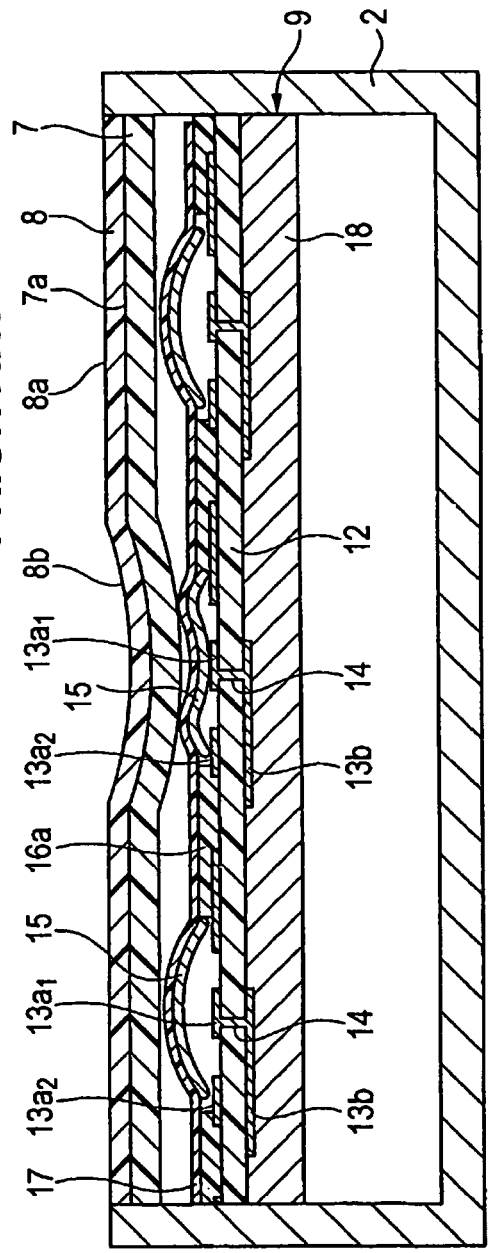
FIG. 6 is a cross-sectional view of a known input device shown in FIG. 4 in Japanese Unexamined Patent Application Publication No. 2002-351606.

FIG. 1 is a perspective view illustrating a computer as an electronic apparatus including an input device according to the present invention; FIG. 2 is an exploded perspective view of the input device according to an embodiment of the present invention; and FIG. 3 is a cross-sectional view taken along line III-III in FIG. 2. In FIG. 2, a Z1 direction corresponds to a direction toward a face sheet (the upward direction of the computer), and a Z2 direction corresponds to a direction toward the interior of the computer (the downward direction). FIGS. 4A to 4C are perspective views illustrating a process for assembling a male connector; and FIGS. 5A and 5B are side views illustrating the states of connection of the connector before and after connection, respectively.

As shown in FIG. 1, an input device 2 according to the present invention is, for example, provided adjacent to a keyboard 4 of a notebook computer 1.

As described below, the input device 2 is a capacitive pointing device that allows a cursor 6 shown in a display screen 5 composed of, for example, thin film transistors (TFTs) to freely move in the display screen 5 in response to the motion of a finger that is placed on a face sheet 10 functioning as an upper surface of the input device 2.

As shown in FIG. 2, the input device 2 includes the face sheet 10 disposed at the highest position in the Z1 direction, coordinate-inputting means 20 disposed on the backside of the face sheet 10, and switching means 30 disposed at the lowest position in the Z2 direction.

As shown in FIG. 3, the face sheet 10 is formed of, for example, a flexible resin sheet having a relatively low frictional coefficient. A plurality of hemispherical protrusions 12 is arranged on an upper surface 11 of the face sheet 10 in a grid manner at regular intervals in the X and Y directions. The protrusions 12 are formed, for example, by applying an ultraviolet (UV) curable resin on the upper surface 11 of the face sheet 10 and then by irradiating the upper surface 11 with UV rays so as to cure the resin. The shape of the protrusions 12 is not limited to hemispherical, but may be conic such as a circular cone and a triangular cone, cylindrical, trapezoidal, or the like. Furthermore, all the protrusions 12 are not required to have the same shape. For example, the protrusion 12 located in the center may have a shape that is different from others, all the protrusions 12 may have different shapes, or the shapes may be different at each area.

With the above-described structures, an operator can recognize the position of his/her finger placed on the face sheet 10 from the shapes and the arrangement of the protrusions 12 detected by the feeling of the fingertip without a visual check of the face sheet 10 since the protrusions 12 are disposed at positions corresponding to switch contact portions 32 included in the switching means 30 (described below).

The coordinate-inputting means 20 includes a thin insulative film serving as a base sheet 21. On a surface of the base sheet 21 (for example, the surface facing the Z1 direction), a plurality of X-direction electrodes 23 extends in the Y direction and is disposed at a predetermined pitch in the X direction. On the other surface (for example, the surface facing the Z2 direction), a plurality of Y-direction electrodes 22 extends in the X direction and is disposed at a predetermined pitch in the Y direction.

A plurality of first positioning holes 21a shown in FIG. 2 is provided in the base sheet 21, and the X-direction electrodes 23 and the Y-direction electrodes 22 are formed on the basis of these first positioning holes 21a.

A first resistive film 24 is disposed above the surface of the base sheet 21 facing the Z1 direction so as to cover the surfaces of the X-direction electrodes 23. In the same way, a second resistive film 25 is disposed below the surface of the base sheet 21 facing the Z2 direction so as to cover the surfaces of the Y-direction electrodes 22.

A ground electrode 26 extends over the lower surface of the second resistive film 25. The lower surface of the ground electrode 26 facing the Z2 direction is covered with a third resistive film 27.

The X-direction electrodes 23, the Y-direction electrodes 22, and the ground electrode 26 are formed by printing a silver paste. The resistive films 24, 25, and 27 insulate the layers from each other and prevent silver from being sulfurated.

As shown in FIGS. 2 and 3, the switching means 30 is disposed below the coordinate-inputting means 20 at a lower position in the Z2 direction. The switching means 30 includes a substrate 31 and the switch contact portions 32 disposed on a surface of the substrate 31 facing the Z1 direction.

The substrate 31 is multilayered, and has a plurality of second positioning holes 32a shown in FIG. 2 at the end portions thereof. On the basis of these second positioning holes 32a, the switch contact portions 32 are arranged on a surface of the substrate 31 facing the Z1 direction in a grid manner at a predetermined pitch in the X and Y directions. Various resistances, a female connector 60, a detecting circuit 70 for detecting variations of capacitances, and the like are disposed on a surface of the substrate 31 facing the Z2 direction.

As shown in FIG. 3, the switch contact portions 32 each include a ring-shaped supporting electrode 33 embedded in the substrate 31, a domical (diaphragm-shaped) invertible plate 34 disposed on the supporting electrode 33, and a contact electrode 35 that is independent of the supporting electrode 33 and is disposed in the center of the supporting electrode 33. The invertible plates 34 are composed of conductive metal, and each include an outer rim portion 34a and a central portion 34b convexed in the Z1 direction. When the central portions 34b are pushed and concaved in the Z2 direction, the lower surfaces of the central portions 34b come into contact with the upper surfaces of the contact electrodes 35. Thus, the supporting electrodes 33 and the contact electrodes 35 are electrically connected via the invertible plates 34 so as to switch between ON and OFF.

As shown in FIG. 3, when a pushing force F is not applied to the central portions 34b (original position), the invertible plates 34 are supported on the supporting electrodes 33 so as to be convexed in the Z1 direction. Thus, the central portions 34b are not in contact with the respective contact electrodes 35.

A holding sheet 37 having an adhesive surface facing the Z2 direction is fixed to the upper surface of the substrate 31. Thus, the invertible plates 34 are held by the adhesive surface of the holding sheet 37, and oppose the respective supporting electrodes 33.

The coordinate-inputting means 20 and the switching means 30 oppose each other with a gap g therebetween. In the gap g, a plurality of projections 28 are arranged on the lower surface of the coordinate-inputting means 20, i.e. the lower surface of the third resistive film 27, in a grid manner at regular intervals in the X directions (e.g., X1 to X2) and the Y directions (e.g., Y1 to Y2)(see FIG. 2). The projections 28 are hemispheres convexed in the Z2 direction, and the tips (lower ends) of the projections 28 are in contact with or disposed adjacent to the central portions 34b of the respective invertible plates 34. The projections 28 can be formed with a UV curable resin as in the case for the protrusions 12 formed on the upper surface of the face sheet 10. The projections 28 are formed as follows: Pins P are fitted into the first positioning holes 21a. Circles 29 indicating positions of the projections 28 to be formed are printed on the lower surface of the third resistive film 27. A small amount of liquid or gelatinous UV curable resin is dropped inside the circles 29. Then, ultraviolet rays are applied thereon. The preferable dimension of the projections 28 ranges from 5.5 to 8.0 mm in pitch in the X and Y directions, from 0.12 to 0.3 mm in height, and from 1.2 to 2.0 mm in diameter. In the above-described range, the operator pushing the face sheet 10 or the protrusions 12 can receive an excellent tactile feel.

As shown in FIG. 2, a plurality of bonding means 41 is disposed on the lower surface of the coordinate-inputting means 20 having the projections 28. The bonding means 41 is disposed on the end portions of the third resistive film 27 outside the area including the projections 28, i.e. at positions adjacent to the end portions in the X and Y directions and at intermediate positions between two adjacent projections 28 in the X and Y directions on the lower surface of the coordinate-inputting means 20. The thickness of the bonding means 41 in the Z direction corresponds to the size of the gap g. In other words, the gap g is formed when the coordinate-inputting means 20 and the switching means 30 adhere to each other via the bonding means 41.

In the above-described description, the bonding means 41 is disposed on the end portions outside the area including the projections 28, and no bonding means 41 is disposed inside the area. Accordingly, the flexibility of the area except for the portions of the projections 28 can be ensured in the coordinate-inputting means 20, and the face sheet 10 and the base sheet 21 can be deformed by a smaller pushing force compared with the known technology. As a result, the operator pushing the upper surface 11 of the face sheet 10 in the Z2 direction can receive an excellent tactile feel.

As shown in FIG. 2, part of the coordinate-inputting means 20 extends outward so as to form a male connector 50. With reference to FIG. 4A, the male connector 50 includes a first connector portion 51 extending from the end portion of the coordinate-inputting means 20 in the Y1 direction, a connecting portion 53 extending from an end portion of a base 51a of the first connector portion 51 in the X direction, and a second connector portion 52 disposed at the end of the connecting portion 53 and having the substantially same shape as that of the first connector portion 51.

For example, a plurality of extension patterns 51A extended from the X-direction electrodes 23 is wired on the first connector portion 51, and a ground pattern 52A extended from the ground electrode is wired on the second connector portion 52. The connecting patterns 51A are formed on the surface of the base sheet 21 of the first connector portion 51 facing the Z1 direction, and the ends are exposed outside the resistive layer. Meanwhile, the ground pattern 52A is formed on the surface of the base sheet 21 facing the Z2 direction, and the end is exposed outside the resistive layer. Carbon ink is applied to the surfaces of the ends of the connecting patterns 51A and the ground pattern 52A exposed outside the resistive layers such that the silver patterns are not directly exposed to the exterior.

As shown in FIG. 4B, in the male connector 50, the connecting portion 53 is folded at an axis L1 adjacent to the first connector portion 51 in an α1 direction, and then folded at an axis L2 adjacent to the second connector portion 52 in an α2 direction. Thus, the second connector portion 52 is superposed on the first connector portion 51 by folding the connecting portion 53 at the two positions. Since an adhesive is applied to the surfaces of the first connector portion 51 and the second connector portion 52 opposing each other, both connector portions are fixed by the adhesive so as to form an integrated male connector 50.

Therefore, the connecting patterns 51A are formed on the surface of the male connector 50 facing the Z1 direction, and the ground pattern 52A is formed on the surface of the male connector 50 facing the Z2 direction.

Moreover, the male connector 50 has a thickness of at least the sum of the thickness of the first connector portion 51 and that of the second connector portion 52, and thus the entire thickness is increased.

As shown in FIGS. 5A and 5B, the male connector 50 is bent such that a base end 50a forms an approximate U shape, and the end portion of the male connector 50 is fitted into a loading slot 61 of the female connector 60 fixed on the surface of the substrate 31 of the switching means 30 facing the Z2 direction. In this manner, the coordinate-inputting means 20 and the detecting circuit 70 disposed on the substrate 31 are electrically connected.

The thickness of the end portion of the male connector 50 is increased as described above. Therefore, even when the end portion of the male connector 50 that is mainly formed of the base sheet 21 of a thin film is fitted into the loading slot 61 of the female connector 60, the connecting patterns 51A and the ground pattern 52A formed on both surfaces of the male connector 50 can be reliably connected with contacts 62 disposed on upper and lower surfaces inside the loading slot 61 of the female connector 60. Thus, poor connection at the contacts between the male connector 50 and the female connector 60 can be avoided.

Operations of the input device will now be described. When the finger of the operator lightly placed on the upper surface of the face sheet 10 is transferred in the X and Y directions, the capacitances formed between the X-direction electrodes 23 and the Y-direction electrodes 22 are varied in response to the position of the finger. The detecting circuit 70 detects voltages indicating the variations of the capacitances at a predetermined sampling period so as to trace the finger moving on the face sheet 10.

Data of the moving path is sent to the notebook computer 1, and processed by software at a control section (not shown). As a result, the cursor 6 on the display screen 5 is transferred according to the moving path of the finger.

Furthermore, when the operator pushes any of the protrusions 12 on the face sheet 10 in the Z2 direction, the face sheet 10 and the coordinate-inputting means 20 are deformed together, and the corresponding projection 28 immediately below the protrusion 12 is pushed in the Z2 direction. At this time, the tip of the projection 28 pushes the central portion 34b of the invertible plate 34 of the corresponding switch contact portion 32. Thus, the invertible plate 34 is convexed in the Z2 direction, and the lower surface of the central portion 34b comes into contact with the corresponding contact electrode 35. As a result, the operating state of the switch contact portion 32 is turned from OFF to ON. In addition, the operator receives a tactile feel by the inverting motion of the invertible plate 34.

In the input device 2, the positions of the switch contact portions 32 disposed on the switching means 30 in the XY-plane coordinates correspond to those of the protrusions 12 disposed on the face sheet 10. Therefore, the switch contact portions 32 can be reliably pushed by pushing the protrusions 12. Moreover, since the projections 28 are disposed immediately above the respective invertible plates 34, the pushing force can be focused on the invertible plates 34 opposing the projections 28. As a result, the switch contact portions 32 can be operated, i.e. the invertible plates 34 can be inverted, by a smaller force, and thus the operator can receive an excellent tactile feel.

In order to merely improve the tactile feel compared with the known technology, the projections 28 opposing the invertible plates 34 are satisfactory, and the protrusions 12 are not necessarily provided on the upper surface 11 of the face sheet 10. However, the protrusions 12 disposed on the upper surface 11 of the face sheet 10 are preferable since the operator can recognize the position of his/her finger on the X-Y coordinates and the positions of the switch contact portions 32 only from the feeling of the fingertip, and also the pushing force can be focused on the switch contact portions 32, resulting in a further improvement of the operability.

Moreover, in the above-described structure, at a lower position of the coordinate-inputting means 20 and between the coordinate-inputting means 20 and the switching means 30, i.e. in an area where the coordinate-inputting means 20 and the switching means 30 oppose each other, the ground electrode 26 extends over the area. Accordingly, the ground electrode 26 functions as a shielding member, and the occurrence of capacitive coupling between the invertible plates 34 adjacent to the switching means 30 and the electrodes 22 and 23 adjacent to the coordinate-inputting means 20 can be prevented. As a result, even when the invertible plates 34 are inverted by the depression, the variations of the capacitances between the X-direction electrodes 23 and the Y-direction electrodes 22 in response to the effect of the inversion can be prevented. Therefore, the coordinate-inputting means 20 can detect coordinate positions more accurately, and input the information to the notebook computer 1.

In the above-described embodiment, only the male connector 50 for the X-direction electrodes is described. However, a similar male connector and a corresponding female connector for the Y-direction electrodes are also provided on the substrate 31. In addition, although not shown above, an output connector connecting the input device 2 and the notebook computer 1 is provided on the substrate 31.

Furthermore, in the above-described embodiment, the connecting portion connecting the first connector portion 51 and the second connector portion 52 is folded at two positions. However, the present invention is not limited to that described above, and may be folded a number of times at more than two positions. In this case, the thickness of the male connector 50 can be further increased.

In the above-described embodiment, a notebook computer is described as an electronic apparatus including the input device 2. However, the present invention is not limited to this, and may be included in other electronic apparatuses such as cellular phones and personal digital assistants (PDAs) as inputting means.

What is claimed is:

1. An input device comprising:
   a face sheet;
   coordinate-inputting means for detecting input received from a user of the input device, the coordinate-inputting means opposing a lower portion of the face sheet;
   switching means for switching a respective operating state of a plurality of switch contact portions based on the input detected via the coordinate-inputting means, the switching means opposing a lower portion of the coordinate-inputting means, the switch contact portions disposed on a surface of the switching means in a grid configuration, wherein the surface of the switching means comprises a plurality of end portions located outside of the grid configuration;
   bonding means for fixing the coordinate-inputting means to the switching means disposed at intermediate positions between two adjacent switch contact portions and at positions outside an area where the switch contact portions are arranged in a grid manner;
   wherein the coordinate-inputting means comprises a plurality of electrodes in a first direction (first direction electrodes) and a plurality of electrodes in a second direction (second direction electrodes) where the first direction electrodes oppose the second direction electrodes and where the first direction electrodes are arranged on a first surface of a base sheet and the second direction electrodes are arranged on a second surface of the base sheet such that the first and the second direction electrodes are arranged in a grid manner;
   wherein the switching means for switching a respective operating state of a plurality of switch contact portions based on the input detected via the coordinate-inputting means comprises a substrate having a plurality of switch contact portions in a grid arrangement, the switch contact portions being switched by an inversion of a plurality of invertible plates from a first state to a second state;
   a plurality of projections disposed on the coordinate-inputting means and opposing the plurality of invertible plates;
   a plurality of hemispherical protrusions protruding upward from an upper surface of the face sheet at positions where the plurality of hemispherical protrusions overlap the plurality of invertible plates and the plurality of projections;
   wherein the convex protrusions protrude from the upper surface of the face sheet in a third direction; and
   a male connector extending from an end portion of the coordinate-inputting means, the male connector comprising:
   a first connector portion in connection with the end portion of the coordinate-inputting means;
   a second connector portion having a shape that is the same as a shape of the first connector portion; and
   a connecting portion connecting the first connector portion to the second connector portion;
   wherein a plurality of direction electrode extension patterns extend from at least one of the first direction electrodes and the second direction electrodes and are formed on a surface of the first connector portion;
   wherein the coordinate-inputting means further comprises a ground electrode, and wherein a ground extension pattern extends from the ground electrode and is formed on a base of the second connector portion;
   wherein the male connector extends from the end portion of the coordinate-inputting means in one of the first direction and the second direction; and
   wherein the male connector is formed by folding the first connector portion and the second connector portion along a plurality of axes, each of the plurality of axes extending in the one of the first direction and the second direction.

2. The input device according to claim 1, wherein at least either of the plurality of projections or the plurality of protrusions is formed with an ultraviolet curable resin.

3. The input device according to claim 1, wherein the base sheet of the coordinate-inputting means comprises a plurality of first positioning holes;
   the substrate of the switching means comprises a plurality of second positioning holes;
   and the base sheet and the substrate are positioned with respect to each other such that the first positioning holes of the plurality of first positioning holes are respectively aligned with the second positioning holes of the plurality of second positioning holes.

4. The input device of claim 1, further comprising:
   a ground electrode provided at an area where the base sheet and the substrate oppose each other.

* * * * *